United States Patent [19]

Bell et al.

[11] Patent Number: 4,794,560

[45] Date of Patent: Dec. 27, 1988

[54] ERASEABLE SELF BIASING THERMAL MAGNETO-OPTIC MEDIUM

[75] Inventors: Alan E. Bell, San Jose; Gary C. Bjorklund, Los Altos; Barry H. Schechtman, San Jose, all of Calif.

[73] Assignee: International Business Machines Corporation, Armonk, N.Y.

[21] Appl. No.: 781,374

[22] Filed: Sep. 30, 1985

[51] Int. Cl.$^4$ .............................................. G11C 13/06
[52] U.S. Cl. ...................................... 365/122; 360/59; 369/13; 369/284; 428/692
[58] Field of Search .................. 365/122; 369/13, 284; 360/59, 135; 428/692, 694

[56] References Cited

U.S. PATENT DOCUMENTS

| | | | |
|---|---|---|---|
| 3,651,504 | 3/1972 | Goldberg et al. | 340/174.1 M |
| 3,680,065 | 7/1972 | Almasi et al. | 340/174 YC |
| 3,702,993 | 11/1972 | Meuhaus et al. | 340/174 YC |
| 3,710,352 | 1/1973 | Smith et al. | 340/173.2 |
| 3,710,353 | 1/1973 | Jacobs et al. | 340/173.2 |
| 3,739,394 | 6/1973 | Becker | 346/74 MT |
| 4,559,573 | 12/1985 | Tanaka et al. | 365/122 |
| 4,586,092 | 4/1986 | Martens et al. | 360/59 |

*Primary Examiner*—James W. Moffitt
*Attorney, Agent, or Firm*—Bradley A. Forrest

[57] ABSTRACT

A thermally written magnetic data storage medium retains desired domains of magnetization having field orientations representative of the data. A first magnetic layer retains one or more domains of desired magnetic field orientations. A second magnetic layer provides a biasing field for obtaining a predetermined magnetic field orientation in the first magnetic layer as a function of the temperature of the second magnetic layer. Disposed between the first and second layers is a thermal isolation layer which provides a thermal barrier for controlling the temperature of the second magnetic layer means. When the medium is heated for a short time, the fringe field from the first layer causes one direction of magnetic orientation to occur in a domain in the first layer. Upon cooling of the domain, the domain magnetization becomes stable with an orientation conforming to the orientation of the fringe field. The thermal isolation layer prevents significant heating of the second layer. Further heating of the domain to erase, heats the second layer substantially to cause it to project a field of predetermined direction opposite from the fringe field direction such that as cooling occurs, the orientation of the domain magnetization stabilizes and conforms to the projected field orientation.

18 Claims, 5 Drawing Sheets

MAGNETIZATION AT AMBIENT TEMPERATURE

MAGNETIZATION AT A TEMPERATURE ABOVE THE DAT LAYER CURIE TEMPERATURE

MAGNETIZATION AS THE LAYERS COOL THROUGH THE CURIE TEMPERATURE OF THE DATA LAYER

MAGNETIZATION AT AMBIENT TEMPERATURE

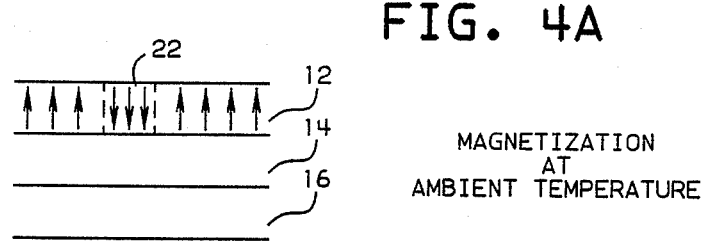
FIG. 4A
MAGNETIZATION AT AMBIENT TEMPERATURE
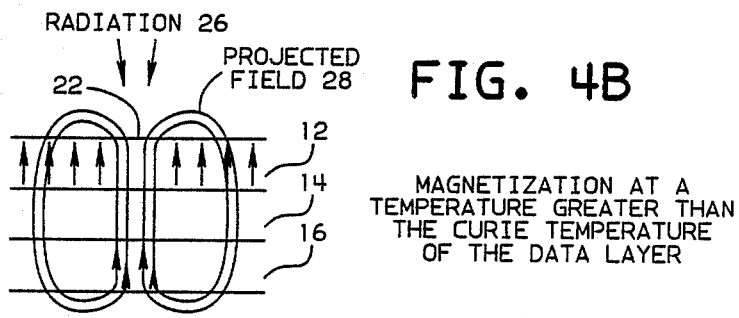
FIG. 4B
MAGNETIZATION AT A TEMPERATURE GREATER THAN THE CURIE TEMPERATURE OF THE DATA LAYER
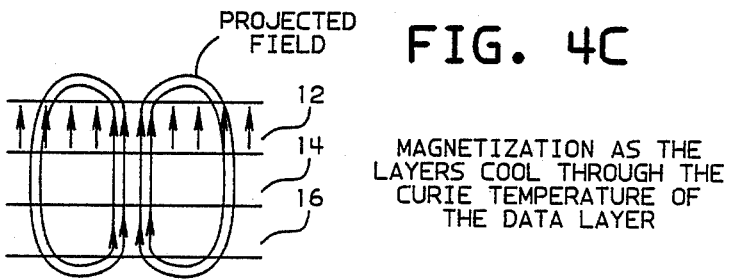
FIG. 4C
MAGNETIZATION AS THE LAYERS COOL THROUGH THE CURIE TEMPERATURE OF THE DATA LAYER
FIG. 4D
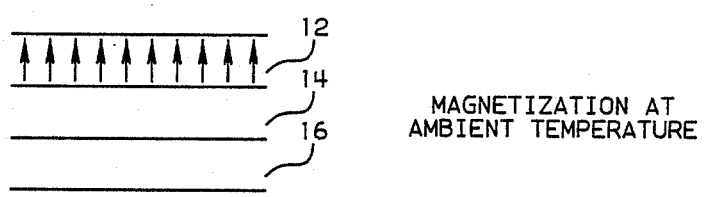
MAGNETIZATION AT AMBIENT TEMPERATURE

ERASEABLE SELF BIASING THERMAL MAGNETO-OPTIC MEDIUM

INCORPORATION BY REFERENCE

Copending Patent Application entitled Self Biasing Thermal Magneto-Optic Medium, Ser. No. 781,618, filed Sept. 30, 1985 on the same date herewith, (now U.S. Pat. No. 4,649,519) assigned to the same assignee as the present application is hereby incorporated by reference.

BACKGROUND OF THE INVENTION

This invention relates to thermal magneto-optic storage mediums and in particular to provision of a biasing field for obtaining desired magnetizations in a storage layer.

In many magneto-optical storage mediums, data is represented by a magnetized domain. The magnetization direction is perpendicular to the medium which is usually a very thin magnetic film. The data is read based on what is called the magneto-optical effect. Basically, the magneto-optical effect is the shift of polarization direction of a polarized light beam when it encounters a magnetized medium as a function of the direction of magnetization of the domain. The polarized light beam is commonly provided by a laser.

To obtain magnetized domains representative of data, a laser is commonly used to heat the magnetic medium in the area where such a domain is desired. The magnetization direction is changed by first heating the magnetized domain to a temperature above its Curie temperature which removes the magnetization. The heating process is then stopped, and a new magnetized domain representative of the desired data begins to form as the temperature begins to fall. The new direction of magnetization depends on an applied external magnetic biasing field which forces the magnetization of the domain to conform to the direction of the external biasing field as the domain cools below its Curie point.

Several schemes have been used to generate the external magnetic biasing field in the past. U.S. Pat. No. 3,702,993 shows a printed wire which traces a tortuous path between discrete areas of the medium. The wire requires energization which must be controllably switched to obtain desired directions of magnetization of the domains. U.S. Pat. Nos. 3,651,504 and 3,739,394 use an external magnetic field producing coil to produce the biasing field.

Other means of providing a biasing field include the use of electric fields to obtain desired directions of electrical polarization of domains in a ferroelectric medium. U.S. Pat. No. 3,710,352 shows the application of a low voltage polarizing potential across ferroelectric media during cooling of selectively heated bit storage areas to change electrical polarization of the media. The voltage source is indicated as an external battery. U.S. Pat. No. 3,710,353 shows a ferroelectric medium in contact with a thermal capacitive region. As the capacitive region is heated with the ferroelectric medium, a voltage transfer occurs from the thermal capacitive region to the ferroelectric region resulting in a net voltage across the ferroelectric region to cause electrical polarization reversal. An energy source for the electric bias field producing capacitive region is required. A switch is also required to provide different polarizations.

A further magnetic medium structure is disclosed in U.S. Pat. No. 3,680,065 in which the Curie point of the storage layer from which data is read, is near ambient room temperature. A second layer in physical contact with the storage layer has a higher Curie temperature and has the same magnetization as the storage layer, and serves to remagnetize the storage layer by quantum exchange coupling if the temperature of the storage layer happens to reach room temperature. The second layer is not used as a biasing field to obtain desired magnetized domains, but merely to retain magnetizations obtained by common techniques.

A primary problem with the above methods of applying biasing fields is that they require a switchable energy source. At the high data recording rates required by today's storage devices, switching the sources becomes a significant problem. It takes more time to switch the source of magnetization than it does for the laser beam to pass by the domain. Thus, when writing data, at least two passes are normally required to obtain desired magnetic orientations in the magnetic domains. Also, the high switching rates produce potentially harmful electromagnetic noise.

SUMMARY OF THE INVENTION

An erasable self biasing magneto-optic storage medium has a first magnetic layer spaced from a second magnetic layer by a thermal isolation layer. The first magnetic layer retains discrete domains of magnetization that represent data. The second magnetic layer is the biasing layer that has temperature dependent magnetic properties. Heating of localized regions of the second magnetic layer produces localized regions of high magnetization that project a biasing magnetic field into the first magnetic layer.

To record data in this storage medium, a portion of the first layer corresponding to a magnetic domain is heated from ambient temperature to a temperature at or above its Curie temperature by a short duration laser pulse. The short duration of the heating pulse causes negligible heating of the second layer due to the insulative properties of the thermal isolation layer. Prior to the heating of the layers, the direction of the magnetization of the first layer is taken to be up. The second layer has negligible magnetization near room temperature, but when it is heated to a temperature near the Curie temperature of the first layer, it becomes strongly magnetized in the up direction.

When the laser is turned off, the layers begin to cool. The temperature of the first layer passes back down through its Curie point and the magnetization of the heated domain flips to the down direction to conform to the direction set by fringe fields from the surrounding unheated regions of the first layer. The thermal isolation layer delays the warming of the second layer so that its thermally induced magnetization does not occur until well after the temperature of the first layer has passed through its Curie point. Thus the second layer has no effect on the recording process.

The erasing process is accomplished using longer duration laser pulses. In this case the thermally induced magnetization of the second layer becomes significant while the first layer is still above its Curie temperature. The bias magnetic field projected by the localized heated region of the second layer is sufficient to override the fringe fields. As the first layer cools down through its Curie temperature, the direction of magnetization of the heated domain flips back to the up direction.

The second layer, in one preferred embodiment, remains at a temperature higher than the first layer for a time after heating because of the insulative effects of the thermal isolation layer. The use of a ferrimagnetic material for the second layer permits the magnetization of the second layer to increase during heating such that a larger magnetic field is projected into the first layer while the first layer is cooling through its Curie temperature.

In the preferred embodiment, the Curie point of the second layer is chosen to be substantially higher than the Curie point of the first layer. The second layer is never heated to its Curie point during either the recording or erasing processes. Thus, localized domains are never written in the second layer and its intrinsic direction of magnetization remains constant, such that the thermally induced magnetization is always in the up direction. This supplies a predetermined orientation to the written domains in the first layer.

A focused laser beam is preferably used to obtain very small domains of magnetization in the medium. The small domains are detected by a beam reflected from the materials and originating from the same laser used to create them. The polarization shift of the beam caused by the magnetization of the first layer during the travel path of the beam indicates the magnetization of the domain. Ths polarization shift is referred to as the Kerr rotation angle. The second layer is optically isolated from the first layer such that the rotation is primarily caused by beam interaction with the first layer.

The provision of an integral biasing field means that smaller magnetic field sources are required because the distance from the source of the field and the storage layer is small. The externally produced fields of prior devices needed to traverse larger distances and hence required more energy to obtain, which lead to slower switching times and significant noise generation. The present invention utilizes the heat of the laser to switch the bias field with little or no noise generation. Having thin film layers and high intensity heat from the focused laser beam results in faster changing of magnetizations, thus periitting one pass writing of data.

BRIEF DESCRIPTION OF THE DRAWINGS

FIGS. 4A, 4B, 4C and 4D are cross section representations of the storage medium of FIG. 1 indicating magnetizations of the layers at different times during an erase operation;

DETAILED DESCRIPTION OF THE INVENTION

Figure 1:
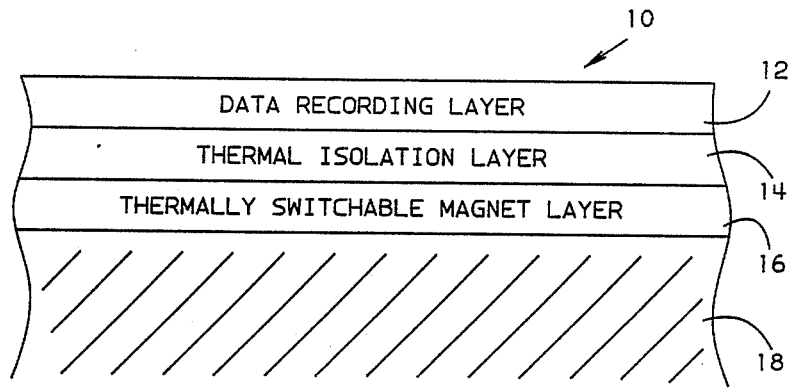
FIG. 1 is a cross section of a storage medium incorporating a first, second and third layer.

In FIG. 1, a part cross section of a thermally writeable storage medium is indicated generally at 10. The medium 10 comprises a first data recording layer 12, a second thermal isolation layer 14, a thermally switchable magnet layer 16 and a substrate 18. First layer 12 is a light absorbing magnet-optic data recording layer. The second layer 14 is a magnetically passive thermal isolation layer. The third layer 16 is a thermally switchable magnet layer. A laser or similar source of heat emits radiation toward first layer 12 for purposes of recording or erasing. In an alternative configuration, layer 12 is deposited on substrate 18, followed successively by layers 14 an 16, and the laser radiation impinges upon layer 12 after passing through substrate 18.

Data recording layer 12 preferably is a ferrimagnetic material with a strong polar Kerr effect, a compensation point temperature near room or ambient temperature, and a Curie point temperature in the range of 150 to 250 degrees Celsius. A variety of rare-earth transition metal alloys fulfill these conditions, including TbFe and TbFeCo alloys with less than approximately 20 atomic percent Co. Other Curie point temperatures outside the range of 150 to 250 degrees will provide varying degrees of operability. The specific range chosen is provided as an example of a range which does not require large power to write and is high enough to provide stability at normal operating temperatures of an office environment.

The second layer 14 preferably comprises a thermal insulator such as $SiO_2$ which is easily deposited to desired thicknesses. The three layers are preferably in the thin film range of thickness to obtain fast thermal responses. The media preferably takes the shape of a disk such as is in common use today. Other physical forms of media will be apparent to those skilled in the art.

The third thermally switchable magnet layer 16 is preferably formed of a ferrimagnetic material with a compensation temperature near room temperature, and with a Curie point temperature substantially above the Curie point temperature of the first layer 12. This material need not be magneto-optically active but should have as large as possible net magnetization somewhere in the temperature range between one-half and one times the Curie point temperature of the first layer 12. Alloys such as GdCo and GdTbCo exhibit such characteristics. In addition, alloys of TbFeCo containing more than approximately 30 atomic percent Co have high Curie temperatures.

Figure 2:
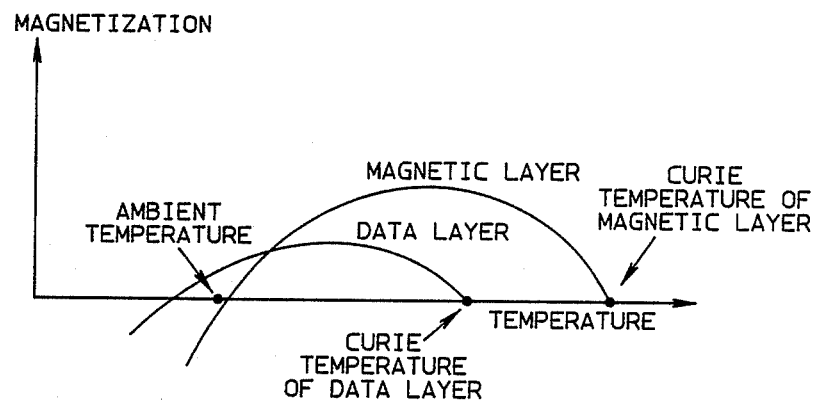
FIG. 2 is a graph of the net magnetization characteristics of the first and third layers of the storage medium of FIG. 1 with respect to temperature.

FIG. 2 indicates net magnetizations of the first layer 12 and the third layer 16 over a large temperature range. The first data layer 12 has a net magnetization which increases with higher temperature from ambient temperature and then decreases to zero at its Curie point temperature. The net magnetization of the third magnetic layer also increases, but is still substantial at the Curie point temperature of the first layer 12. At higher temperatures, it too decreases to zero when its Curie point temperature is attained.

The initial state of the recording medium 10 is for the first and third layers to be uniformly magnetized in a direction perpendicular to the surfaces of the medium, indicated by arrows as 'up' in FIG. 3 wherein the numbering is consistent with FIG. 1. Since the compensation temperature of the third layer is near room temperature, and since its magnetization is laterally uniform, the projection of its magnetization onto the first layer is neglected in the initial state. However, the third layer is configured such that when it is heated to a temperature near the Curie temperature of the first layer, it becomes strongly magnetized in the 'up' direction.

Figure 3A:
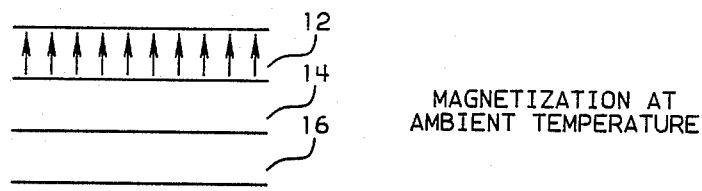
FIGS. 3A, 3B, 3C and 3D are cross section representations of the storage medium of FIG. 1 indicating magnetizations of the layers at different times during a write operation.
Figure 3B:
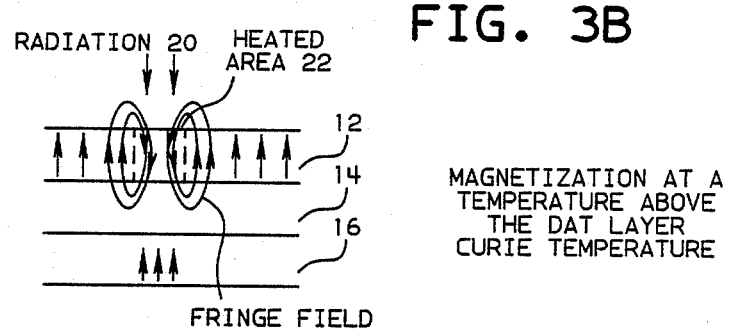
Figure 3C:
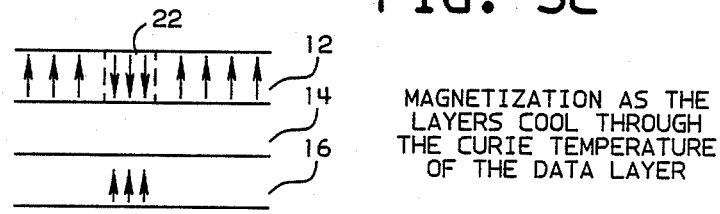
Figure 3D:
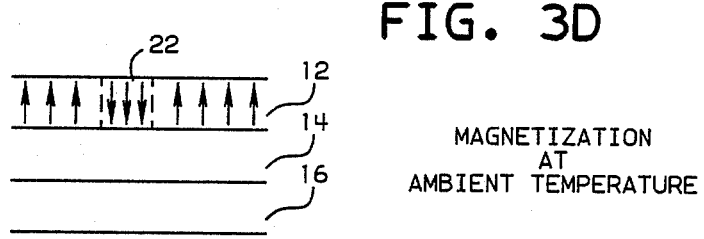

A recording process is indicated in FIGS. 3B, 3C and 3D wherein the numbering is consistent with FIG. 3A. A short laser pulse provides radiation indicated at 20. The radiation 20 causes a heating of the first layer to a temperature above the first layer Curie point temperature. A heated area referred to as a domain of magnetization 22 occurs in the portion of the first layer which is so heated. The second layer delays the third layer from significant heating, so its thermally induced magnetization does not significantly project onto the first layer. A fringe field 24 develops from the regions of the first layer adjacent to the heated area and causes the direction of magnetization to flip, producing a localized domain with magnetization in the down direction.

In FIG. 3C, the first layer is cooled through its Curie temperature and the domain 22 becomes stable. The temperature of the third layer may be slightly increasing at this time and thus increasing its projected field, but the domain 22 is at a lower FIG. 3D indicates the media at ambient temperature having a domain 22 with a magnetic orientation in the down direction and representative of desired data. Several domains may be formed in this manner along the media. The domains must be sufficiently horizontally spaced from each other to obtain desired fringe fields to form the domains.

Erasing of the domain 22 is indicated in FIGS. 4A, 4B, 4C and 4D wherein the numbering is consistent with FIGS. 3A through 3D. The initial state of the recording medium after data has been recorded is for the first layer to contain stable recorded spots or domains that are magnetized 'down' while the surrounding first layer material is magnetized 'up' as indicated in FIG. 4A. The third layer is still in its virgin condition of 'up' magnetization. Erasing is accomplished by heating the first layer to a temperature above its Curie point temperature using a longer duration laser pulse indicated by radiation at 26 in FIG. 4B. In this case the second thermal isolation layer no longer substantially delays the warming of the third layer and its temperature rises to a value that produces a significant localized thermally induced magnetization in the third layer at the time that the first layer cools back down through its Curie point temperature. The localized magnetization in the third layer projects an external bias field 28 in the 'up' direction into that region of the first layer heated above its Curie point temperature. This projected field from the third layer overrides the 'down' pointing fringe field from the surrounding first layer material and causes the direction of magnetization of the recorded spot to flip back to the 'up' direction when it cools back down through its Curie point temperature. After cooling to ambient temperature, the third layer returns to its original condition and the recorded spot in the first layer has been erased.

Figure 5:
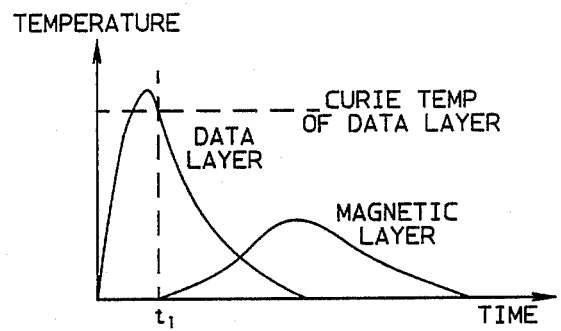
FIG. 5 is a temperature versus time graph of the temperatures of the first and third layers of the storage medium of FIG. 1 during a write operation.
Figure 6:
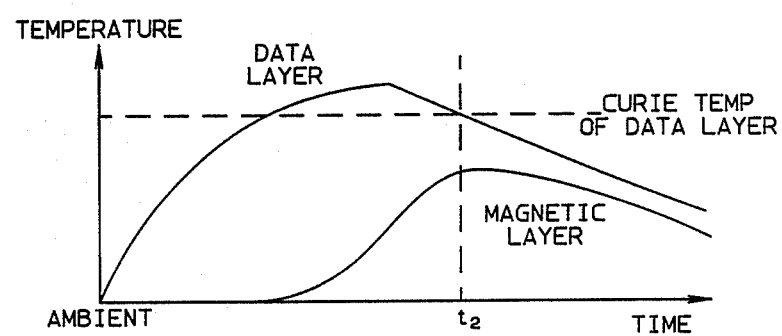
FIG. 6 is a temperature versus time graph of the temperatures of the first and third layers of the storage medium of FIG. 1 during an erase operation.

FIGS. 5 and 6 show the temperatures of the first and third layers during the respective write and erase operations of FIGS. 3A-D and FIGS. 4A-D. In FIG. 5, during the write operation, the temperature of the first layer 12 reaches its Curie point temperature and cools through its Curie point temperature at time t1 before the third layer is significantly heated.

In FIG. 6, the temperature of the third layer significantly rises by the time $t_2$ that the temperature of the first layer passes back through its Curie point temperature. This causes the thermally induced field of the third layer to be great enough to overcome the fringe field from the surrounding first layer material.

It is important that the third layer film is not raised above its Curie point temperature and hence does not contain stable domains of magnetization different than that of the surrounding horizontally adjacent material. The existence of localized regions of magnetization in this layer is simply a consequence of the temperature dependence of the magnetization of the third layer.

Figure 7:
FIG. 7 is a representation of laser footprints used to write and erase magnetized domains.

The short and long pulse exposure times required to effect recording and erasing, respectively are for example achieved using a two beam approach. In FIG. 7, footprints of the laser beam incident on the media are indicated at 32 and 34. Footprint 32 is the footprint of the writing beam, while footprint 34 is the elongated footprint of the erasing beam. In this example, the exposure time of a region in the medium is a function of the speed of motion of the medium with respect to the beam and the dimension of the beam. As an alternative example, footprints of equal dimension could be used for the writing and erasing beams and the total exposure of a region in the medium could be controlled by direct modulation of the laser intensity.

In the example of FIG. 7, the power density in the elongated footprint 34 is significantly less than that in the write footprint 32 so that although the exposure time for a domain is prolonged, the maximum temperature of the first layer is still limited to a value just above the Curie point temperature of the first layer. The first layer does not heat to a higher temperature because for the prolonged exposure times, it loses heat to the layers below. This in turn increases the temperature rise of the third layer.

The thickness of the second thermal isolation layer is a function of the duration and power density of the laser beam used to erase the domains. An example of the design process for choosing the thickness d of the insulative second layer uses a thermal diffusivity of the layer equal to 0.006 centimeters squared per second, which is a value close to that for silicon dioxide.

The diffusion length for heat is a function of the thermal diffusivity and the period during which diffusion takes place. Typically the thermal profile projects a distance of about twice the diffusion length into the body of the heated material. Using a recording pulse time of 50 nanoseconds yields a thickness d of approximately 0.25 micrometers. In order to achieve a reasonable heating of the third layer during erasure requires a longer pulse. A pulse approximately ten times longer, or 500 to 600 nanoseconds sufficiently heats the third layer so that it projects a field strong enough to overcome fringe fields. With a write spot of 1 micrometer, the erase spot has a length of approximately 10 micrometers. This requirement is consistent with practical optical data storage systems.

Optical record and erase characteristics for data stored in the first layer will depend on the relationship between the total effective fields at the boundary of the demagnetized region in the first layer. The total effective field resulting from the long erase pulse should be opposite in direction and comparable to, or somewhat greater than, the effective field developed during the short record pulse. This condition will ensure complete erasure of the previously written domain.

Figure 8:
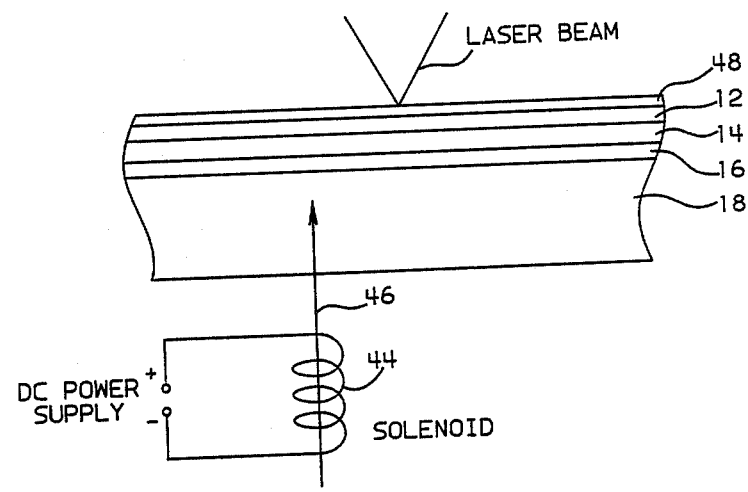
FIG. 8 is a cross section representation of the storage medium of FIG. 1 employing a fourth dielectric layer having antireflection properties.

The relative magnitudes of the total effective field in the record and erase cycle may be adjusted through the employment of an externally supplied DC magnetic field. Such a field may be generated by a small solenoid 44 in FIG. 8 positioned adjacent to the surface of the disk, such that its projected field 46 is normal the first layer and extends throughout the region where the laser beam is incident. It is important to note that this externally generated magnetic field is not modulated, but serves only to provide a constant offset in order to optimize the relationship of the total effective fields at the recorded spot boundary during record and erase cycles.

It is well known that the Kerr rotation angle of a magneto-optic material can be enhanced by incorporating the magneto-optic layer into a thin film antireflection structure. Such an approach can lead to improved signal to noise ratio during readout, and also to improved sensitivity during record and erase cycling. A reduced reflectivity of a storage medium in FIG. 8 where the numbering is consistent with FIG. 1, can be achieved through the addition of a fourth dielectric layer 48, coated onto the data recording layer 12. If layer 12 is thick enough to be optically opaque then a reduction in the overall reflectivity of the storage medium occurs when the fourth layer 48 is approximately $(2m+1)(\lambda/4n)$, thick, with $m=0,1,2\ldots$ (where $\lambda$ is the wavelength of the laser beam and n ss the refractice index of the fourth layer). [See for example T. Chen et al "An Investigation of Amorphous Tb-Fe Films for Magneto-Optic Memory Application" IEEE Trans. Magnetics Vol. Mage-16(5) p. 1194–1196 (1980)]. If layer 12 is thin enough to be partially transmitting, then the overall reflectivity of the storage medium is reduced by the simultaneous optimal choice of the thickness of the fourth superposed dielectric layer 48 and that of the data recording layer, 12, and the thermal isolation layer, 14. The optimization of the optical properties of a storage medium comprised of four layers is outlined in "Magneto-optic Recording" by M. Mansuripur and G. A. N. Connell in Proceedings of the SPIE Vol. 42, p. 222-230, 1983. It should be noted that in such optimization of the optical properties, the thickness of the dielectric thermal isolation layer, 14 must still satisfy the thermal time constant requirements which differentiate the temperature rise response to the short recording and the long erasing pulses.

While the invention has been described in terms of a preferred embodiment, it will be recognized by those skilled in the art that it may take other forms and still be within the scope of the following claims.

What is claimed is:

1. A thermally written magnetic data storage medium for retaining desired domains of magnetization having field orientations representative of the data comprising:
   first magnetic layer means for retaining one or more domains of desired magnetic field orientations;
   second magnetic layer means for providing a biasing field for obtaining a predetermined magnetic field orientation in the first magnetic layer as a function of the temperature of the second magnetic layer means; and
   thermal layer means disposed between the first and second magnetic layer means for providing a thermal barrier for controlling the temperature of the second magnetic layer means.

2. The data storage medium of claim 1 wherein the desired magnetic field orientations of the first layer means are changeable as a function of the biasing field from the second layer means and selected levels of focussed heat applied to the domains of the data storage medium.

3. The data storage medium of claim 1 wherein the first and second magnetic layer means comprise ferrimagnetic materials.

4. The data storage medium of claim 3 wherein the Curie temperature of the second magnetic layer means is greater than the Curie temperature of the first magnetic layer means.

5. The data storage medium of claim 1 wherein the net magnetization of a portion of the second magnetic layer means adjacent to a domain in the first layer means increases as the temperature of the portion of the second magnetic layer means increases.

6. The data storage medium of claim 1 wherein the surface of the first magnetic layer is large compared to its thickness and wherein heating of a domain of the surface of the first magnetic layer to a temperature above its Curie point causes a fringe field to be generated within the domain which has an orientation substantially opposite to the orientation of the first magnetic layer immediately surrounding the domain.

7. The data storage medium of claim 6 wherein the second magnetic layer projects a magnetic field having a predetermined orientation onto the first magnetic layer when the second magnetic layer is significantly heated.

8. The data storage medium of claim 7 wherein the projected magnetic field from the significantly heated second magnetic layer is greater than the fringe field as the first magnetic layer cools below its Curie point temperature such that the domain retains magnetization having an orientation consistent with the predetermined orientation of the projected field from the second magnetic layer.

9. The data storage medium of claim 1 wherein the thermal layer means controls heating of the second magnetic layer means as a function of the length of time the thermal layer means is heated.

10. The data storage medium of claim 1 and further comprising heating means for providing a first heat burst type for orientating magnetization of a domain in a first direction and a second heat burst type for orientating magnetization of a domain in a second direction.

11. The data storage medium of claim 10 wherein the thermal layer means prevents the first heat burst type from significantly heating the second magnetic layer means such that the fringe field from the first magnetic layer means in the heated domain is greater than the projected field from the second magnetic layer.

12. The data storage medium of claim 10 wherein the thermal layer means permits the second heat burst type to heat the second magnetic layer means such that the projected field from the second magnetic layer is greater than the fringe field from the first magnetic layer means in the heated domain.

13. The data storage medium of claim 1 and further comprising an external field producing means for projecting a constant magnetic field of predetermined direction onto at least the first layer means.

14. The data storage medium of claim 13 wherein said external field producing means comprises a solenoid for projecting a magnetic field substantially normal to the first layer means.

15. The data storage medium of claim 1 and further comprising an antireflective dielectric layer disposed on the first layer means.

16. The data storage medium of claim 15 wherein the thicknesses of the antireflective dielectric layer, first magnetic layer means and thermal layer means are chosen to minimize light reflection.

17. A method of returning magnetization of a self biasing magnetic medium to a predetermined direction, the medium having a first layer for retaining domains of magnetization representative of data, a second layer for providing a magnetic biasing field of predetermined direction, and a third layer disposed between the first and second layers for providing a desired amount of thermal isolation of the second layer, comprising the steps of:

heating a domain in the first layer to a temperature above the Curie temperature of the first layer to reduce its net magnetization to substantially zero;

heating the second layer to a predetermined temperature to increase its net magnetization so that it projects a magnetic field of known orientation onto the first layer; and cooling the first and second layers to a temperature below the Curie temperature of the first layer such that the orientation of magnetization of the first layer is in the predetermined direction.

18. The method of claim 17 wherein the third layer retards heat flow from the first layer to the second layer such that the termperature of the first layer cools through its Curie temperature at a time when the temperature of the second layer is about the predetermined temperature.

* * * * *